(12) United States Patent
Shimizu et al.

(10) Patent No.: US 12,283,659 B2
(45) Date of Patent: Apr. 22, 2025

(54) SOLID-STATE BATTERY

(71) Applicant: Murata Manufacturing Co., Ltd., Nagaokakyo (JP)

(72) Inventors: Keisuke Shimizu, Nagaokakyo (JP); Yosuke Tomoshige, Nagaokakyo (JP); Akira Baba, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 626 days.

(21) Appl. No.: 17/577,434

(22) Filed: Jan. 18, 2022

(65) Prior Publication Data

US 2022/0140388 A1 May 5, 2022

Related U.S. Application Data

(63) Continuation of application No. PCT/JP2020/026594, filed on Jul. 7, 2020.

(30) Foreign Application Priority Data

Jul. 18, 2019 (JP) ................................. 2019-132453

(51) Int. Cl.
*H01M 10/0562* (2010.01)
*H01M 10/0585* (2010.01)

(52) U.S. Cl.
CPC ... *H01M 10/0562* (2013.01); *H01M 10/0585* (2013.01); *H01M 2300/0071* (2013.01)

(58) Field of Classification Search
CPC ...................... H01M 10/0585; H01M 10/0562
See application file for complete search history.

(56) References Cited

U.S. PATENT DOCUMENTS

| | | | |
|---|---|---|---|
| 2007/0042265 A1* | 2/2007 | Tamai | H01M 10/0562 264/618 |
| 2014/0120409 A1 | 5/2014 | Ouchi et al. | |
| 2017/0263981 A1 | 9/2017 | Satou | |
| 2019/0280327 A1 | 9/2019 | Sato et al. | |
| 2020/0212497 A1* | 7/2020 | Kitamura | B32B 38/0004 |
| 2020/0328428 A1* | 10/2020 | Ohta | H01M 4/661 |

(Continued)

FOREIGN PATENT DOCUMENTS

| | | | | |
|---|---|---|---|---|
| EP | 3734741 A1 * | 11/2020 | ......... | G02B 6/4249 |
| JP | 2006261008 A | 9/2006 | | |
| JP | 2012243743 A | 12/2012 | | |

(Continued)

OTHER PUBLICATIONS

Machine translation of JP 2015-026563 A (no date) (Year: 0000).*

(Continued)

*Primary Examiner* — Amanda C. Walke
(74) *Attorney, Agent, or Firm* — ArentFox Schiff LLP

(57) ABSTRACT

A solid-state battery that includes a solid-state battery layered body including a positive electrode layer, a negative electrode layer, and a solid electrolyte interposed between the positive electrode layer and the negative electrode layer, wherein at least one electrode layer of the positive electrode layer and the negative electrode layer has a tapered shape toward an edge of the electrode layer in a sectional view thereof, and the positive electrode layer, the negative electrode layer, and the solid electrolyte are an integrally sintered body.

18 Claims, 8 Drawing Sheets

(56) References Cited

U.S. PATENT DOCUMENTS

2022/0069347 A1* 3/2022 Funada ................ H01M 4/131

FOREIGN PATENT DOCUMENTS

| | | |
|---|---|---|
| JP | 2013131342 A | 7/2013 |
| JP | 2014222564 A | 11/2014 |
| JP | 2015026563 A | 2/2015 |
| JP | 2016091750 A | 5/2016 |
| JP | 2016207540 A | 12/2016 |
| JP | 2017168429 A | 9/2017 |
| JP | 2020107521 A | 7/2020 |
| WO | 2013008677 A1 | 1/2013 |
| WO | 2018025649 A1 | 2/2018 |
| WO | 2018062080 A1 | 4/2018 |

OTHER PUBLICATIONS

International Search Report issued for PCT/JP2020/026594, date of mailing Aug. 11, 2020.
Written Opinion of the International Searching Authority issued for PCT/JP2020/026594, date of mailing Aug. 11, 2020.

* cited by examiner

SOLID-STATE BATTERY

CROSS REFERENCE TO RELATED APPLICATIONS

The present application is a continuation of International application No. PCT/JP2020/026594, filed Jul. 7, 2020, which claims priority to Japanese Patent Application No. 2019-132453, filed Jul. 18, 2019, the entire contents of each of which are incorporated herein by reference.

FIELD OF THE INVENTION

The present invention relates to a solid-state battery. More specifically, the present invention relates to a layered solid-state battery.

BACKGROUND OF THE INVENTION

Conventionally, secondary batteries that can be repeatedly charged and discharged have been used for various applications. For example, secondary batteries may be used as a power source for electronic devices such as smart phones and laptop computers.

In the secondary battery, a liquid electrolyte is generally used as a medium for ion transfer that contributes to charging and discharging. That is, a so-called electrolytic solution is used in the secondary battery. However, in such a secondary battery, safety is generally required in terms of preventing leakage of the electrolytic solution. Further, since the organic solvent and the like used in the electrolytic solution are flammable substances, safety is also required in that respect.

In light of the above, research on a solid-state battery using a solid electrolyte in place of the electrolytic solution has been advanced.

Patent Document 1: Japanese Patent Application Laid-Open No. 2016-207540

SUMMARY OF THE INVENTION

A solid-state battery includes a solid-state battery layered body composed of a positive electrode layer, a negative electrode layer, and a solid electrolyte therebetween (see, Patent Document 1). For example, as shown in FIGS. 10A to 10C, in a solid-state battery layered body 500', a positive electrode layer 10A and a negative electrode layer 10B are stacked with a solid electrolyte 20 interposed therebetween. The solid-state battery layered body 500' is provided with a positive electrode terminal 30A and a negative electrode terminal 30B, which are external terminals and in contact with two opposite side surfaces of the solid-state battery layered body 500' (that is, a positive electrode side end surface 500'A and a negative electrode side end surface 500'B), respectively. Here, the positive electrode layer 10A and the negative electrode layer 10B extend so as to terminate at the positive electrode side end surface 500'A and the negative electrode side end surface 500'B, respectively.

The inventors of the present application have noticed that there are still problems to be overcome with the previously proposed solid-state batteries as described above, and have found the need to take measures for that purpose. Specifically, the inventors of the present application have found that there are the following problems.

A solid-state battery may be mainly composed of an electrode region (that is, the positive electrode layer 10A and the negative electrode layer 10B) containing an electrode active material, and an electrolyte region (for example, the solid electrolyte 20) containing a solid electrolyte and/or an insulating material and being in contact with the electrode region. The electrolyte region may be referred to as an insulating material region. The materials constituting the electrode region and the electrolyte region may have significantly different thermal and mechanical properties from each other. Therefore, if there is a portion where the proportion of constituent materials changes drastically at the boundary portion between these regions, a stress generated inside the solid-state battery during production or use of the solid-state battery may cause cracking or peeling in the portion.

The present invention has been made in view of the above problems. That is, a main object of the present invention is to provide a solid-state battery that more preferably prevents deterioration of battery performance by reducing cracking and peeling of the positive electrode layer and/or the negative electrode layer during charging and discharging.

The inventors of the present application have attempted to solve the above-described problems by addressing the problems in a new direction rather than addressing the problems as an extension of the prior art. As a result, the inventors of the present application have invented a solid-state battery that achieves the above main purpose.

According to the present invention, there is provided a solid-state battery including: a solid-state battery layered body including a positive electrode layer, a negative electrode layer, and a solid electrolyte interposed between the positive electrode layer and the negative electrode layer, wherein in a sectional view of the solid-state battery, at least one electrode layer of the positive electrode layer and the negative electrode layer has a tapered shape toward an edge of the electrode layer; and the positive electrode layer, the negative electrode layer, and the solid electrolyte are an integrally sintered body.

The solid-state battery according to an embodiment of the present invention is a solid-state battery that more preferably prevents deterioration of battery performance by reducing cracking and peeling of the positive electrode layer and/or the negative electrode layer during charging and discharging.

More specifically, in the solid-state battery of the present invention, at least one electrode layer has a tapered shape toward the edge of the electrode layer in a sectional view thereof. Thereby, a structure can be formed in which the proportion of the constituent materials gradually changes at the boundary portion between the electrode region and the electrolyte region or the insulating material region. Further, the contact area between the electrode region and the electrolyte region or the insulating material region can be increased. Therefore, the strength of the solid-state battery can be increased, whereby cracking or peeling at the boundary portion between the electrode region and the electrolyte region can be suppressed. As a result, it is possible to more preferably prevent deterioration of the battery performance of the solid-state battery, thus enabling improvement in the long-term reliability of the solid-state battery.

DETAILED DESCRIPTION OF THE INVENTION

Figure 1:
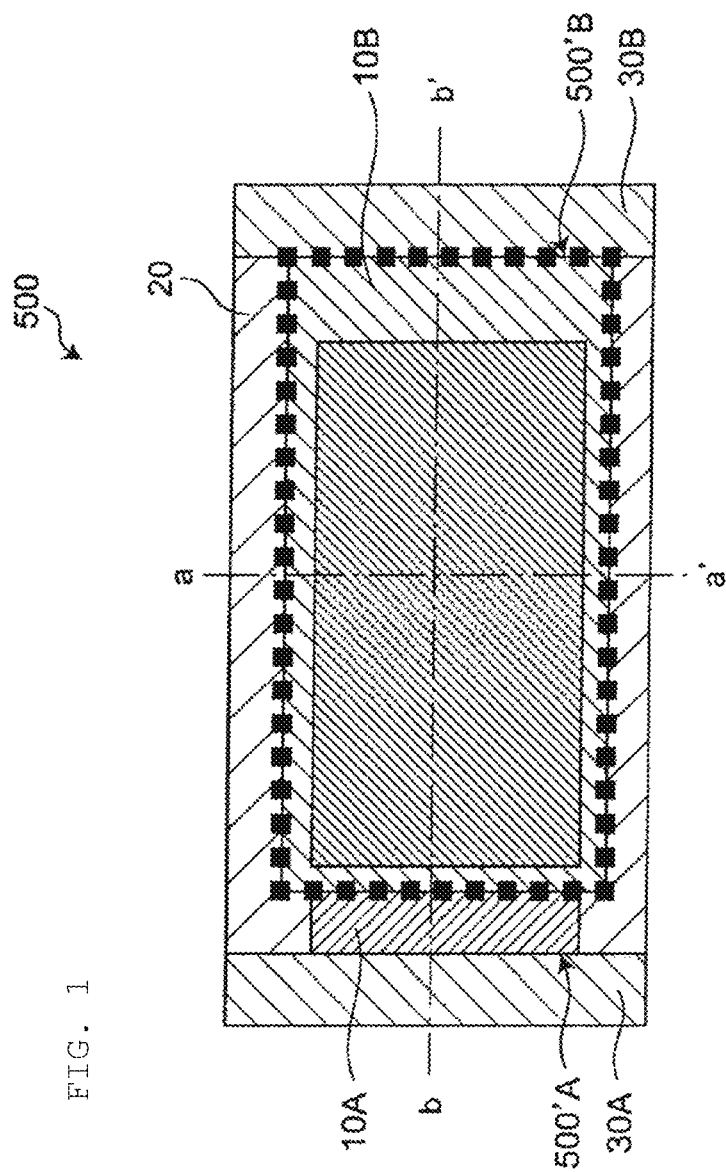
FIG. 1 is a plan view schematically showing a solid-state battery according to an embodiment of the present invention.

Hereinafter, the solid-state battery of the present invention will be described in detail. Although the description will be given with reference to the drawings as necessary, the illustrated contents are merely schematically and exemplary for the understanding of the present invention, and the appearance, dimensional ratio, and the like may differ from the actual ones.

The "solid-state battery" as used in the present invention refers to a battery whose constituent elements are composed of solids in a broad sense, and in a narrow sense, an all solid-state battery whose components (particularly preferably all constituent elements) are composed of solids. In a preferred embodiment, the solid-state battery in the present invention is a layered solid-state battery in which layers forming the battery constituent unit are stacked to each other, and preferably, such layers are formed of a sintered body. Such a "solid-state battery" includes not only a so-called "secondary battery" which can be repeatedly charged and discharged, but also a "primary battery" which can only be discharged. In a preferred embodiment of the present invention, the "solid-state battery" is a secondary battery. The "secondary battery" is not overly bound by its name and may include, for example, a power storage device.

The "plan view" as used herein is based on a form in which an object is captured from above or below along the thickness direction based on the stacking direction of each layer constituting the solid-state battery. Further, the "sectional view" as used herein is a form when viewed from a direction substantially perpendicular to the thickness direction based on the stacking direction of each layer constituting the solid-state battery (in short, a form when the solid-state battery is cut on a plane parallel to the thickness direction). For example, the "sectional view" is based on a form of the section along a direction in which the electrode layer extends in contact with the external terminal (specifically, the longitudinal direction) or a direction perpendicular to the longitudinal direction.

[Basic Configuration of Solid-State Battery]

The solid-state battery includes a solid-state battery layered body including a positive electrode layer, a negative electrode layer, and a solid electrolyte or a solid electrolyte layer interposed between the positive electrode layer and the negative electrode layer.

In the solid-state battery, each layer constituting the solid-state battery is preferably formed by firing, and the positive electrode layer, the negative electrode layer, the solid electrolyte, and the like can form a sintered body. More preferably, the positive electrode layer, the negative electrode layer, and the solid electrolyte are each integrally fired, and thus the battery constituent unit is integrally sintered.

The positive electrode layer is an electrode layer containing at least a positive electrode active material. The positive electrode layer may further contain a solid electrolyte and/or a positive electrode sub-current collector layer. In a preferred embodiment, the positive electrode layer is composed of a sintered body that includes at least a positive electrode sub-active material layer containing a positive electrode active material and solid electrolyte particles, and a positive electrode sub-current collector layer. In another embodiment, the positive electrode layer may have a current collector-free structure that does not include a positive electrode sub-current collector layer. That is, the positive electrode layer may contain a positive electrode active material without a current collector layer as a sub-layer, or may contain a positive electrode active material and a solid electrolyte without a current collector layer.

On the other hand, the negative electrode layer is an electrode layer containing at least a negative electrode active material. The negative electrode layer may further contain a solid electrolyte and/or a negative electrode sub-current collector layer. In an embodiment, the negative electrode layer is composed of a negative electrode sub-active material layer containing a negative electrode active material and solid electrolyte particles, and a sintered body containing at least a negative electrode sub-current collector layer. In another embodiment, the negative electrode layer may have a current collector-free structure that does not include a negative electrode sub-current collector layer. That is, the negative electrode layer may contain a negative electrode active material without a current collector layer as a sub-layer, or may contain a negative electrode active material and a solid electrolyte without a current collector layer.

The positive electrode active material and the negative electrode active material are substances involved in the transfer of electrons in the solid-state battery. Charging and discharging are performed by the movement (conduction) of ions between the positive electrode layer and the negative electrode layer via the solid electrolyte and the transfer of electrons between the positive electrode layer and the negative electrode layer via an external circuit. The positive electrode layer and the negative electrode layer are particularly preferably layers capable of occluding and releasing lithium ions or sodium ions. That is, it is preferable to use an all solid-state secondary battery in which charging and discharging of the battery is performed by movement of lithium ions or sodium ions between the positive electrode layer and the negative electrode layer via the solid electrolyte.

(Positive Electrode Active Material)

The positive electrode active material that can be contained in the positive electrode layer is, for example, a lithium-containing compound. The type of the lithium-containing compound is not particularly limited, and is, for example, a lithium transition metal composite oxide and a lithium transition metal phosphoric acid compound. The lithium transition metal composite oxide is a general term for oxides containing lithium and one or more types of transition metal elements as constituent elements. The lithium transition metal phosphoric acid compound is a general term for phosphoric acid compounds containing lithium and one or more types of transition metal elements as constituent elements. The type of the transition metal element is not particularly limited, and examples thereof include cobalt (Co), nickel (Ni), manganese (Mn), and iron (Fe).

The lithium transition metal composite oxide is, for example, a compound represented by $Li_xM1O_2$ and $Li_yM2O_4$. The lithium transition metal phosphoric acid compound is, for example, a compound represented by $Li_zM3PO_4$. However, each of M1, M2 and M3 is one or more types of transition metal elements. The respective values of x, y and z are any values.

Specifically, the lithium transition metal composite oxide is, for example, $LiCoO_2$, $LiNiO_2$, $LiVO_2$, $LiCrO_2$, and $LiMn_2O_4$. Further, the lithium transition metal phosphoric acid compound is, for example, $LiFePO_4$ and $LiCoPO_4$.

In addition, to be described from another perspective, the positive electrode active material that can be contained in the positive electrode layer may be, for example, at least one selected from the group consisting of a lithium-containing phosphoric acid compound having a NASICON structure, a lithium-containing phosphoric acid compound having an olivine structure, a lithium-containing layered oxide, and a lithium-containing oxide having a spinel structure. An example of the lithium-containing phosphoric acid compound having a NASICON structure is $Li_3V_2(PO_4)_3$. An example of the lithium-containing phosphoric acid compound having an olivine structure is $Li_3Fe_2(PO_4)_3$, $LiFePO_4$, and/or $LiMnPO_4$. An example of the lithium-containing layered oxide is $LiCoO_2$ and $LiCo_{1/3}Ni_{1/3}Mn_{1/3}O_2$. An example of the lithium-containing oxide having a spinel structure is $LiMn_2O_4$ and $LiNi_{0.5}Mn_{1.5}O_4$.

Similarly, the positive electrode active material capable of occluding and releasing sodium ions may be at least one selected from the group consisting of a sodium-containing phosphoric acid compound having a NASICON structure, a sodium-containing phosphoric acid compound having an olivine structure, a sodium-containing layered oxide, and a sodium-containing oxide having a spinel structure.

(Negative Electrode Active Material)

Examples of the negative electrode active material that can be contained in the negative electrode layer include carbon materials, metallic materials, lithium alloys, and lithium-containing compounds.

Specifically, the carbon material is, for example, graphite, graphitizable carbon, non-graphitizable carbon, mesocarbon microbeads (MCMB), and highly oriented graphite (HOPG).

The metallic material is a general term for materials containing, as constituent elements, one or more types of metal elements and semimetal elements capable of forming alloys with lithium. This metallic material may be a simple substance, an alloy, or a compound. Since the purity of the simple substance described here is not necessarily limited to 100%, the simple substance may contain a trace amount of impurities.

Examples of the metal element and the semimetal element include silicon (Si), tin (Sn), aluminum (Al), indium (In), magnesium (Mg), boron (B), gallium (Ga), germanium (Ge), lead (Pb), bismuth (Bi), cadmium (Cd), titanium (Ti), chromium (Cr), iron (Fe), niobium (Nb), molybdenum (Mo), silver (Ag), zinc (Zn), hafnium (Hf), zirconium (Zr), yttrium (Y), palladium (Pd), and platinum (Pt).

Specific examples of the metallic material include Si, Sn, $SiB_4$, $TiSi_2$, SiC, $Si_3N_4$, $SiO_v$ (0<v≤2), LiSiO, $SnO_w$ (0<w≤2), $SnSiO_3$, LiSnO, and $Mg_2Sn$.

The lithium-containing compound is, for example, a lithium transition metal composite oxide. The definition of the lithium transition metal composite oxide is as described above. Specific examples of the lithium transition metal composite oxide include $Li_3V_2(PO_4)_3$, $Li_3Fe_2(PO_4)_3$, and $Li_4Ti_5O_{12}$.

In addition, to be described from another perspective, the negative electrode active material contained in the negative electrode layer may be, for example, at least one selected from the group consisting of an oxide containing at least one element selected from the group consisting of Ti, Si, Sn, Cr, Fe, Nb, and Mo, a graphite-lithium compound, a lithium alloy, a lithium-containing phosphoric acid compound having a NASICON structure, a lithium-containing phosphoric acid compound having an olivine structure, and a lithium-containing oxide having a spinel structure. An example of the lithium alloy is Li—Al. An example of the lithium-containing phosphoric acid compound having a NASICON structure is $Li_3V_2(PO_4)_3$ and/or $LiTi_2(PO_4)_3$. An example of the lithium-containing phosphoric acid compound having an olivine structure is $Li_3Fe_2(PO_4)_3$ and/or $LiCuPO_4$. An example of the lithium-containing oxide having a spinel structure is $Li_4Ti_5O_{12}$.

Similarly, the negative electrode active material capable of occluding and releasing sodium ions may be at least one selected from the group consisting of a sodium-containing phosphoric acid compound having a NASICON structure, a sodium-containing phosphoric acid compound having an olivine structure, and a sodium-containing oxide having a spinel structure.

The positive electrode layer and/or the negative electrode layer may contain an electron conductive material. Examples of the electron conductive material that can be contained in the positive electrode layer and/or the negative electrode layer include carbon materials and metal materials. Specific examples of the carbon material include graphite and carbon nanotubes. Examples of the metal material include copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), and the metal material may also be an alloy of two or more thereof.

Further, the positive electrode layer and/or the negative electrode layer may contain a binder. The binder is, for example, any one or more types of synthetic rubbers and polymer materials. Specific examples of the synthetic rubber include styrene-butadiene rubber, fluororubber, and ethylene propylene diene. Examples of the polymer material include at least one selected from the group consisting of polyvinylidene fluoride, polyimide, and acrylic resin.

The positive electrode layer and/or the negative electrode layer may further contain a sintering aid. Examples of the sintering aid include at least one selected from the group consisting of lithium oxide, sodium oxide, potassium oxide, boron oxide, silicon oxide, bismuth oxide, and phosphorus oxide.

The thicknesses of the positive electrode layer and the negative electrode layer are not particularly limited. The thicknesses of the positive electrode layer and the negative electrode layer may be, for example, each independently 2 µm to 100 µm, and may be particularly 5 µm to 50 µm.

(Solid Electrolyte)

The solid electrolyte is a material capable of conducting lithium ions or sodium ions. In particular, the solid electrolyte, which forms the battery constituent unit in the solid-state battery, forms a layer in which lithium ions can be conducted between the positive electrode layer and the negative electrode layer. The solid electrolyte may be provided at least between the positive electrode layer and the negative electrode layer. That is, the solid electrolyte may also be present around the positive electrode layer and/or the negative electrode layer so as to protrude from between the positive electrode layer and the negative electrode layer. Specific examples of the solid electrolyte include any one or more types of a crystalline solid electrolyte, a glass solid electrolyte, and a glass ceramic solid electrolyte.

Examples of the crystalline solid electrolyte include oxide crystal materials and sulfide crystal materials. Examples of the oxide crystal material include $Li_xM_y(PO_4)_3$ having a NASICON structure ($1 \leq x \leq 2$, $1 \leq y \leq 2$, M is at least one selected from the group consisting of Ti, Ge, Al, Ga, and Zr, and for example, $Li_{1.3}Al_{0.3}Ti_{1.7}(PO_4)_3$), $La_{0.51}Li_{0.34}TiO_{2.94}$ having a perovskite structure, and $Li_7La_3Zr_2O_{12}$ having a garnet structure. Examples of the sulfide crystal material include $Li_{3.25}Ge_{0.25}P_{0.75}S_4$ and $Li_{10}GeP_2S_{12}$. The crystalline solid electrolyte may contain a polymer material (for example, polyethylene oxide (PEO)).

Examples of the glass solid electrolyte include oxide glass materials and sulfide glass materials. Examples of the oxide glass material include $50Li_4SiO_4$ and $50Li_3BO_3$. Examples of the sulfide glass material include $30Li_2S-26B_2S_3-44LiI$, $63Li_2S-36SiS_2-1Li_3PO_4$, $57Li_2S-38SiS_2-5Li_4SiO_4$, $70Li_2S-30P_2S_5$, and $50Li_2S-50GeS_2$.

Examples of the glass ceramic solid electrolyte include oxide glass ceramic materials and sulfide glass ceramic materials. Examples of the oxide glass ceramic material include $Li_{1.07}Al_{0.69}Ti_{1.46}(PO_4)_3$ and $Li_{1.5}Al_{0.5}Ge_{1.5}(PO_4)$. Examples of the sulfide glass ceramic material include $Li_7P_3S_{11}$ and $Li_{3.25}P_{0.95}S_4$.

From the viewpoint of excellent air stability and ease in formation of a sintered body, the solid electrolyte preferably contains at least one selected from the group consisting of an oxide crystal material, an oxide glass material, and an oxide glass ceramic material.

In other words, the solid electrolyte may be, for example, a lithium-containing phosphoric acid compound having a NASICON structure, an oxide having a perovskite structure, or an oxide having a garnet structure or a structure similar to the garnet structure. Examples of the lithium-containing phosphoric acid compound having a NASICON structure include $Li_xM_y(PO_4)_3$ ($1 \leq x \leq 2$, $1 \leq y \leq 2$, M is at least one selected from the group consisting of Ti, Ge, Al, Ga, and Zr). An example of the lithium-containing phosphoric acid compound having a NASICON structure is $Li_{1.2}Al_{0.2}Ti_{1.8}(PO_4)_3$. An example of the oxide having a perovskite structure is $La_{0.55}Li_{0.35}TiO_3$. An example of the oxide having a garnet structure or a structure similar to the garnet structure is $Li_7La_3Zr_2O_{12}$.

Similarly, the solid electrolyte capable of conducting sodium ions may be, for example, a sodium-containing phosphoric acid compound having a NASICON structure, an oxide having a perovskite structure, or an oxide having a garnet structure or a structure similar to the garnet structure. Examples of the sodium-containing phosphoric acid compound having a NASICON structure include $Na_xM_y(PO_4)_3$ ($1 \leq x \leq 2$, $1 \leq y \leq 2$, M is at least one selected from the group consisting of Ti, Ge, Al, Ga, and Zr).

The solid electrolyte layer may contain, for example, a binder and/or a sintering aid. The binder and/or the sintering aid that can be contained in the solid electrolyte layer may be selected from, for example, materials similar to the binder and/or the sintering aid that can be contained in the positive electrode layer and/or the negative electrode layer.

The thickness of the solid electrolyte layer located between the positive electrode layer and the negative electrode layer is not particularly limited. The thickness of the solid electrolyte layer may be, for example, 1 µm to 15 µm, and may be particularly 1 µm to 5 µm.

(Positive Electrode Sub-Current Collector Layer/Negative Electrode Sub-Current Collector Layer)

The positive electrode layer may include a positive electrode sub-current collector layer as its sub-layer. Similarly, the negative electrode layer may include a negative electrode sub-current collector layer as its sub-layer. In such a case, as the positive electrode current collector material that can constitute the positive electrode sub-current collector layer and the negative electrode current collector material that can constitute the negative electrode sub-current collector layer, it is preferable to use a material having a high electrical conductivity, for example, at least one selected from the group consisting of a carbon material, silver, palladium, gold, platinum, aluminum, copper, and nickel.

Each of the positive electrode sub-current collector layer and the negative electrode sub-current collector layer has an electrical connection portion for electrically connecting to the outside, and may be configured to be electrically connectable to the terminal. The positive electrode sub-current collector layer and the negative electrode sub-current collector layer may each be in the form of a foil. From the viewpoint of improving electron conductivity and reducing production cost by integral sintering, the positive electrode sub-current collector layer and the negative electrode sub-current collector layer are preferably in the form of an integrated sintered body.

When the positive electrode sub-current collector layer and the negative electrode sub-current collector layer are in the form of a sintered body, they are composed of, for example, a sintered body containing an electron conductive material, a solid electrolyte, a binder and/or a sintering aid. The electron conductive material contained in the positive electrode sub-current collector layer and the negative electrode sub-current collector layer may be selected from, for example, the same materials as the electron conductive material that can be contained in the positive electrode layer and/or the negative electrode layer. The binder and/or the sintering aid contained in the positive electrode sub-current collector layer and the negative electrode sub-current collector layer may be selected from, for example, materials similar to the binder and/or the sintering aid contained in the positive electrode layer and/or the negative electrode layer.

The thicknesses of the positive electrode sub-current collector layer and the negative electrode sub-current collector layer are not particularly limited. The thicknesses of the positive electrode sub-current collector layer and the negative electrode sub-current collector layer may be, for example, each independently 1 µm to 10 µm, and particularly may be 1 µm to 5 µm.

(Insulating Material)

The insulating material refers to a material that does not conduct electricity, that is, a material that can be composed of a non-conductive material. Although not particularly limited, the insulating material may be composed of, for example, a glass material and/or a ceramic material. The insulating material can be formed to electrically insulate the positive electrode layer, the negative electrode layer, and the external terminal, and may be provided at a desired position in the solid-state battery layered body. For example, the insulating material may be provided so as to be located between the positive electrode layer and/or the negative electrode layer and the external terminal. As the insulating material, for example, a glass material may be selected. The glass material is not particularly limited, and examples thereof include at least one selected from the group consisting of soda lime glass, potash glass, borate glass, borosilicate glass, barium borosilicate glass, zinc borate glass, barium borate glass, bismuth borosilicate glass, bismuth zinc borate glass, bismuth silicate glass, phosphate glass, aluminophosphate glass, and zinc phosphate glass. The ceramic material is not particularly limited, but examples thereof include at least one selected from the group consisting of aluminum oxide ($Al_2O_3$), boron nitride (BN), silicon dioxide ($SiO_2$), silicon nitride ($Si_3N_4$), zirconium oxide ($ZrO_2$), aluminum nitride (AlN), silicon carbide (SiC), and barium titanate ($BaTiO_3$).

The insulating material may contain a solid electrolyte, a binder and/or a sintering aid. The binder and/or the sintering aid contained in the insulating material may be selected from, for example, materials similar to the binder and/or the sintering aid that can be contained in the positive electrode layer and/or the negative electrode layer.

(Protective Layer)

The solid-state battery may be provided with a protective layer. Such a protective layer can generally be formed on the outermost side of the solid-state battery, and is particularly intended to electrically, physically and/or chemically protect the solid-state battery layered body. Preferably, the material or protective material constituting the protective layer has excellent insulating property, durability and/or moisture resistance, and is environmentally safe. For example, it is preferable to use glass, ceramics, thermosetting resin, and/or photocurable resin.

(External Terminal)

The solid-state battery is generally provided with external terminals. In particular, a positive electrode terminal and a negative electrode terminal are each provided on opposite side surfaces of the solid-state battery layered body. That is, a pair of a positive electrode terminal and a negative electrode terminal is provided on the side surfaces of the solid-state battery. More specifically, a pair of a terminal on the positive electrode side connected to the positive electrode layer and a terminal on the negative electrode side connected to the negative electrode layer is provided. It is preferable to use a material having a high electrical conductivity for such terminals. The material of the terminal is not particularly limited, and examples thereof include at least one selected from the group consisting of silver, gold, platinum, aluminum, copper, tin, and nickel. The external terminal may contain a resin material (for example, epoxy resin) as a binder.

[Characteristics of Solid-State Battery of Present Invention]

The solid-state battery of the present invention is a solid-state battery including a solid-state battery layered body including a positive electrode layer, a negative electrode layer, and a solid electrolyte interposed between the positive electrode layer and the negative electrode layer. The solid-state battery of the present invention is characterized in the shape of the electrode layer (that is, at least one of the positive electrode layer and the negative electrode layer) constituting the solid-state battery layered body.

More specifically, in a sectional view of the solid-state battery, at least one electrode layer of the positive electrode layer and the negative electrode layer has a tapered shape toward the edge of the electrode layer. In other words, in at least one electrode layer, the thickness dimension of the electrode layer is preferably gradually or stepwise reduced toward the edge of the electrode layer. Here, the "edge" of the electrode layer refers to the outer edge of the electrode region in a plan view of the solid-state battery (for example, the dotted line portion in FIG. 1, specifically, the edge of the negative electrode layer). Further, the "tapered shape" refers to a shape in which at least the thickness dimension of the edge of the electrode layer is preferably gradually or stepwise smaller than the thickness dimension of the electrode layer portion other than the edge in a sectional view of the same electrode layer.

In the solid-state battery of the present invention, at least one electrode layer has a tapered shape toward the edge of the electrode layer. This allows the solid-state battery to have a structure in which the proportion of constituent materials gradually changes at the boundary portion between the electrode region and the electrolyte region. In addition, such a configuration can increase the contact area between the electrode region and the electrolyte region. Therefore, the strength of the solid-state battery can be increased, and cracking, peeling, or the like at the boundary portion between the electrode region and the electrolyte region can be more preferably suppressed. That is, a more desirable solid-state battery is provided in terms of preventing deterioration of the battery performance of the solid-state battery.

Figure 2:
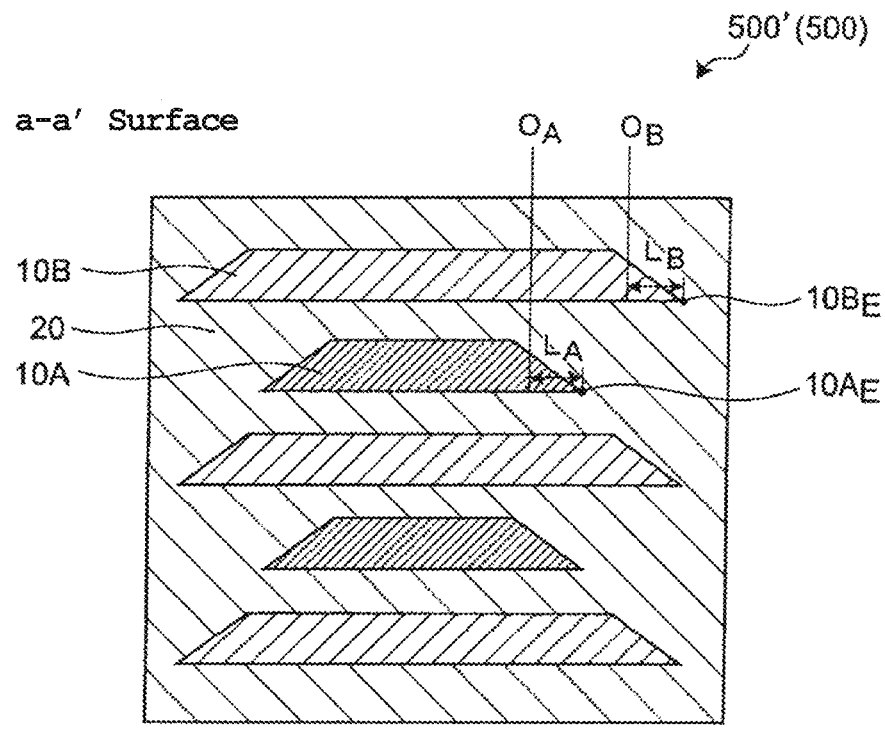
FIG. 2 is a schematic view showing an embodiment of the section of the solid-state battery along the a-a' line in FIG. 1.

In the illustrated exemplary embodiment, in a sectional view of the solid-state battery layered body 500', at least one electrode layer of the positive electrode layer 10A and/or the negative electrode layer 10B has a tapered shape toward the edge $10A_E$ (edge of the positive electrode layer) and/or $10B_E$ (edge of the negative electrode layer) of the electrode layer (see, FIG. 2). In other words, the peripheral edge portion (see, FIG. 1) of the positive electrode layer 10A and/or the negative electrode layer 10B in a plan view of the solid-state battery layered body 500' may have a tapered shape in a sectional view thereof.

Figure 4:
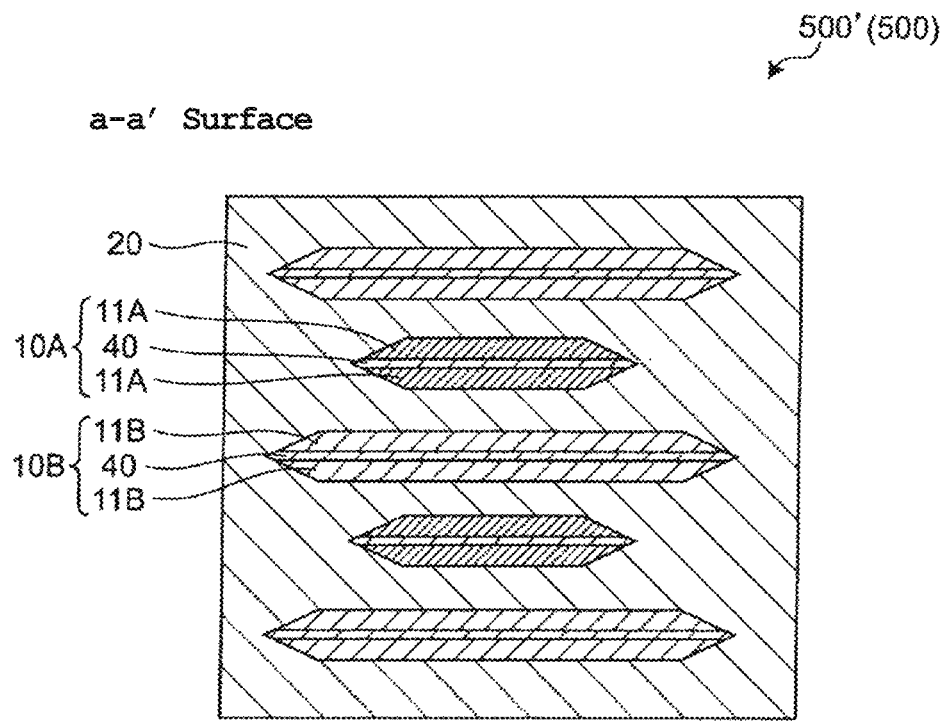
FIG. 4 is a schematic view showing yet another embodiment of the section of the solid-state battery along the a-a' line in FIG. 1.
Figure 5:
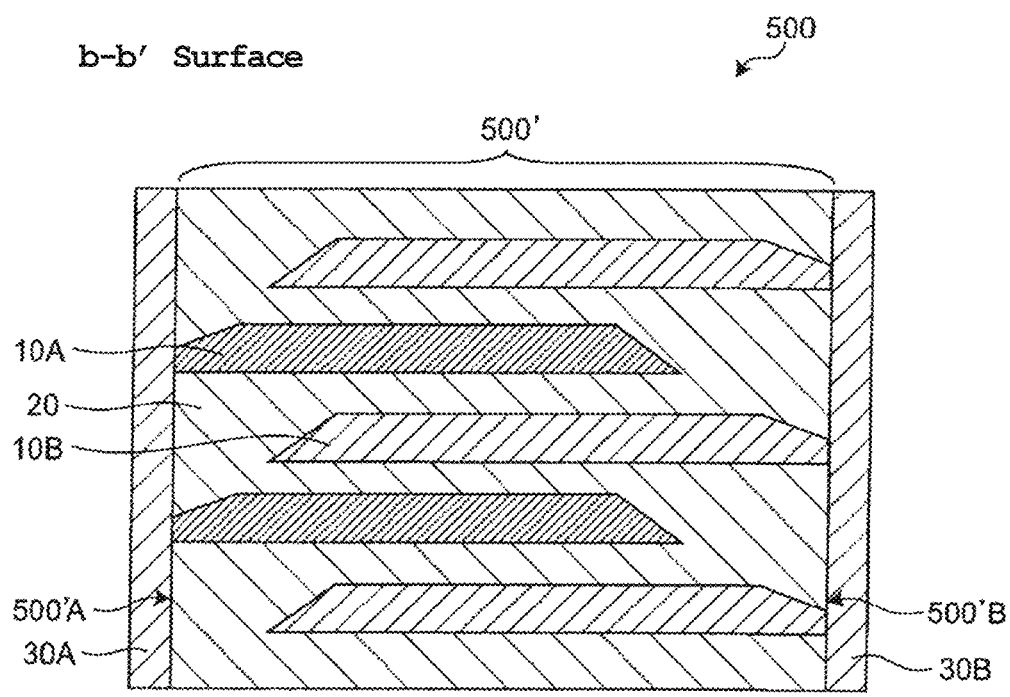
FIG. 5 is a schematic view showing an embodiment of the section of the solid-state battery along the b-b' line in FIG. 1.
Figure 6:
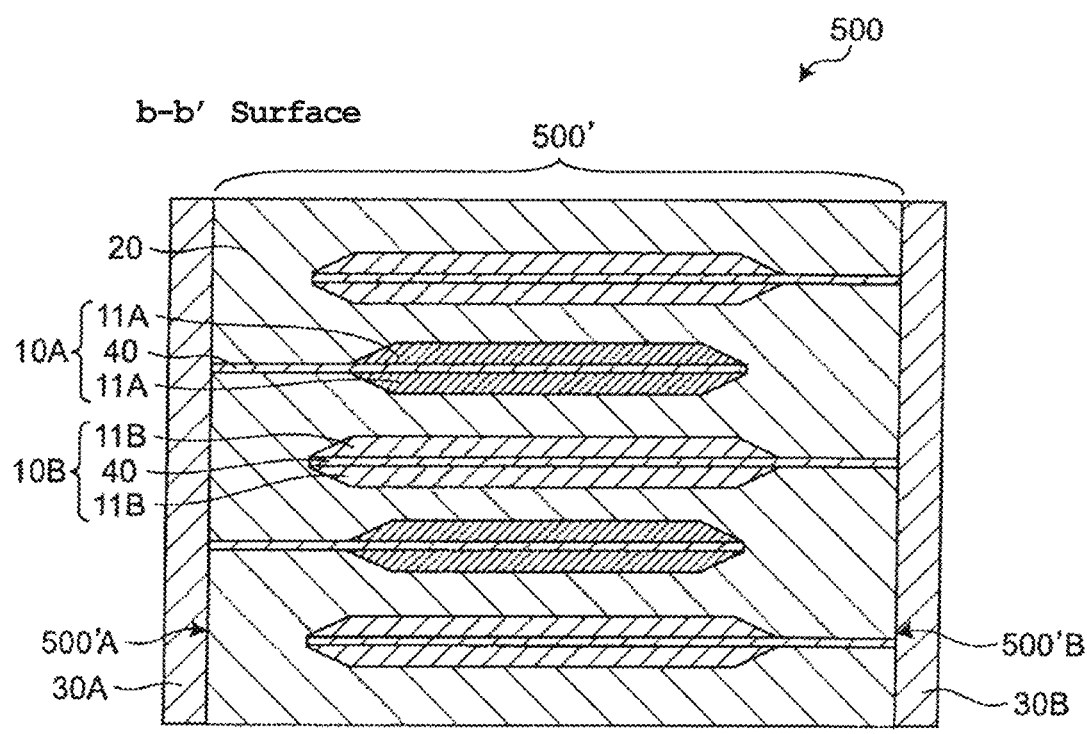
FIG. 6 is a schematic view showing another embodiment of the section of the solid-state battery along the b-b' line in FIG. 1.

The tapered shape of the edge of the electrode layer may be formed in a section along the positive electrode side end surface (or the negative electrode side end surface) of the solid-state battery layered body. In the exemplary embodiment, the tapered shape may be formed at the edge of the electrode layer in the section along the a-a' line in FIG. 1 (see, FIGS. 2 to 4). Alternatively, the tapered shape in the electrode layer may be formed in a section along the direction in which the electrode layer extends to the outer edge of the solid-state battery layered body. In the exemplary embodiment, the tapered shape may be formed at the edge of the electrode layer in the section along the b-b' line in FIG. 1 (see, FIGS. 5 and 6).

Figure 7A:
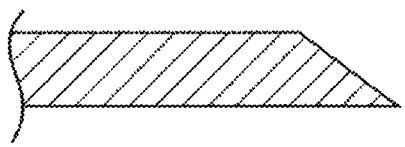
FIGS. 7A to 7H are schematic sectional views respectively showing various embodiments of the tapered shape of the electrode layer in the solid-state battery according to an embodiment of the present invention.
Figure 7B:
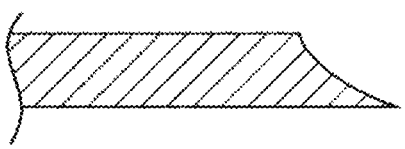
Figure 7C:
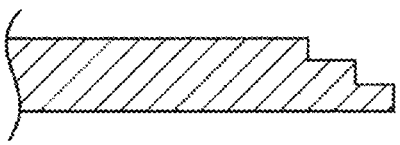

As a more specific tapered shape in the solid-state battery of the present invention, in a sectional view of an electrode layer 10 composed of only a electrode sub-active material layer 11, a linear shape may be formed such that the thickness dimension of the electrode layer gradually decreases toward the edge thereof (see, FIG. 7A), a curved shape may be formed (see, FIG. 7B), or a stepped shape may be formed such that the thickness dimension gradually decreases (see, FIG. 7C). The linear shape and the curved shape may be mixed in a portion having the same tapered shape. In the tapered shape, a curved shape is preferably formed in a sectional view of the electrode layer 10. Thereby, the contact area between the electrode region and the electrolyte region can be increased.

Figure 7D:
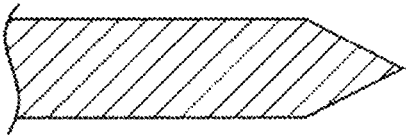
Figure 7E:
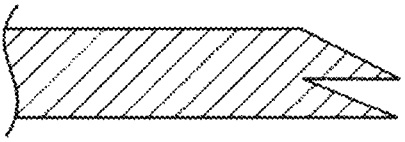
Figure 7F:
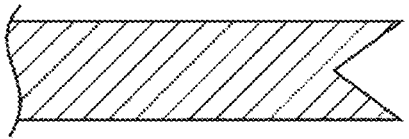

The tapered shape may be subdivided into two sections. For example, the tapered shape may be subdivided so that the electrode layer 10 has tapered surfaces on both sides or upper and lower surfaces in the electrode stacking direction (see, FIG. 7D); subdivided so that the electrode layer 10 has two tapered surfaces in the same direction in the electrode stacking direction (see, FIG. 7E); or subdivided so that the tapered surfaces face each other in the electrode stacking direction (see, FIG. 7F). The tapered shape is preferably subdivided so that the electrode layer 10 has tapered surfaces on both sides or upper and lower surfaces in the electrode stacking direction. Thereby, stress concentration in the portion can be more effectively prevented. In addition, the configuration of the solid-state battery in a sectional view can be made a substantially symmetrical shape, so that the structural stability can be further improved.

Figure 7G:
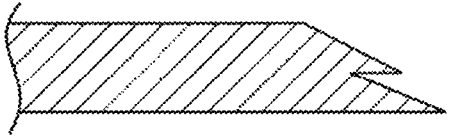
Figure 7H:
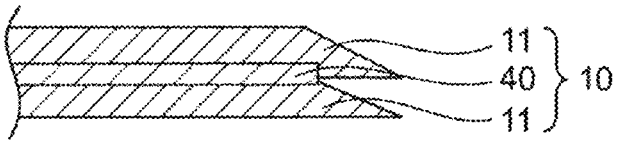

The tapered shape subdivided into two sections may have regularity in the electrode stacking direction (see, FIGS. 7D to F), and does not need to have regularity (see, FIG. 7G). Further, the electrode layer 10 may be configured such that a sub-current collector layer 40 is interposed between the two electrode sub-active material layers 11 having a tapered shape (see, FIG. 7H). The tapered shape in the electrode layer may be formed at least in the electrode sub-active material layer 11, and may be formed together with the sub-layer (for example, the sub-current collector layer 40) other than the electrode sub-active material layer 11, which forms the electrode layer 10.

In an embodiment, the electrode layer has a tapered shape starting from a position where the distance from the edge of the electrode layer is, for example, in a range of 10 μm to 200 μm. In the exemplary embodiment shown in FIG. 2, in the positive electrode layer 10A and/or the negative electrode layer 10B, a tapered shape is formed such that the starting point ($O_A$ and/or $O_B$) of the tapered shape is a position where the distance $L_A$ and/or $L_B$ from the respective edges 10A$_E$ and/or 10B$_E$ is, for example, in a range of 10 μm to 200 μm. With such a configuration, a structure can be formed in which the proportion of the constituent materials gradually changes at the boundary portion between the electrode region and the electrolyte region while maintaining a higher amount of active material in the portion where the electrode layers face each other. Thereby, the strength of the solid-state battery can be increased while maintaining the battery capacity higher.

The "starting point" forming the tapered shape as used herein refers to, for example, a position where the thickness of the electrode active material layer in the electrode layer is reduced by 5% with respect to the thickness of the central portion of the electrode active material layer (for example, the thickness of a substantially parallel portion of the electrode active material layer in a sectional view). Specifically, the starting point refers to a position where the thickness of the electrode active material layer is reduced by 5% with respect to the average value of thicknesses of the electrode active material layer at any five points where the distance from the edge of the electrode layer is in a range of 200 μm to 1 mm. When a portion composed of materials other than the material constituting the electrode layer (for example, a solid electrolyte or an insulating material) is present in the electrode stacking direction of one electrode layer, the total value of the thickness of the electrode active material layer portion in the electrode stacking direction may be taken as the thickness of the electrode active material layer. Further, when a current collector layer is interposed between two electrode sub-active material layers having a tapered shape in one electrode layer (for example, the positive electrode layer 10A in FIG. 3), the two electrode active material layers may each have a starting point forming the tapered shape. In other words, the two electrode active material layers may each have a starting point at a position where the thickness of each electrode active material layer is reduced by 5% with respect to the thickness of the central portion of each electrode active material layer. In the above description of the starting point, the electrode active material layer may be an electrode sub-active material layer.

In an embodiment, the electrode layer may have a tapered shape toward at least one of the edges of the electrode layer that terminate inside the solid-state battery layered body. In other words, the electrode layer may have a tapered shape toward at least one of the edges that terminate in contact with the solid electrolyte (or insulating material). In the exemplary embodiment shown in FIG. 1, the electrode layer of the positive electrode layer 10A and/or the negative electrode layer 10B may have a tapered shape toward at least one of the edges at which the electrode layer terminates in contact with the solid electrolyte 20. The edge of the electrode layer that terminates inside the solid-state battery layered body may have a larger contact area with the electrolyte region (for example, solid electrolyte 20). Thus, the electrode layer having a tapered shape toward such an edge can increase the strength of the solid-state battery more effectively. The electrode layer preferably has a tapered shape toward all edges at which the electrode layer terminates inside the solid-state battery layered body.

In an embodiment, a plurality of electrode layers having a tapered shape may be formed. Providing a plurality of electrode layers having a tapered shape can increase the structure in which the proportion of the constituent materials gradually changes at the boundary portion between the electrode region and the electrolyte region. In addition, the contact area between the electrode region and the electrolyte region can be increased. The number of electrode layers having a tapered shape which are to be formed is preferably half or more the number of all electrode layers, and more preferably ¾ or more the number of all electrode layers.

Figure 10A:
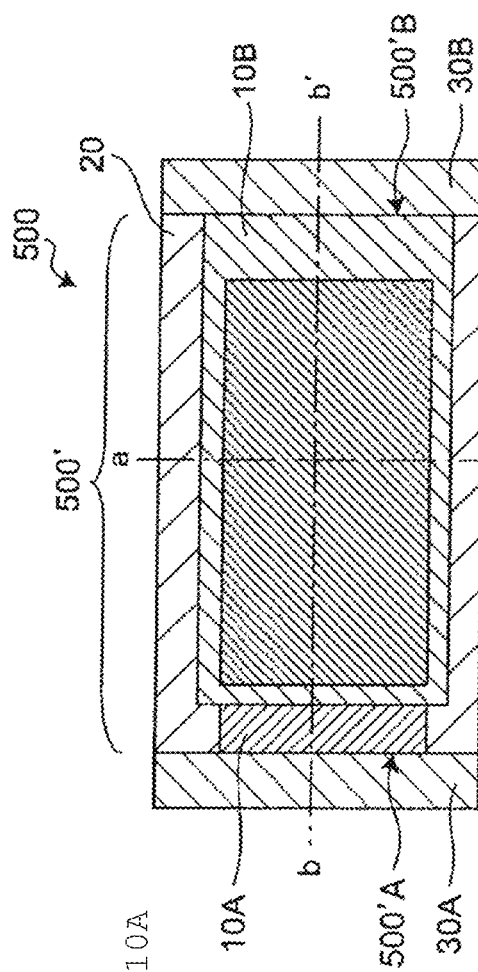
FIGS. 10A to 10C are a schematic plan view and schematic sectional views showing a conventional solid-state battery.
Figure 10C:
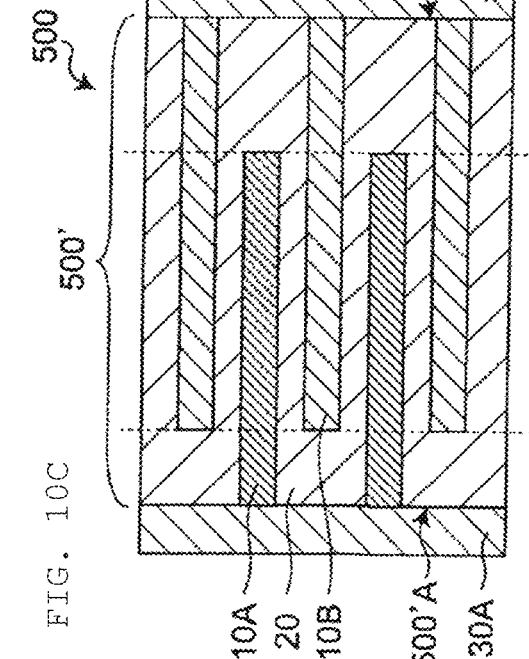
Figure 10B:
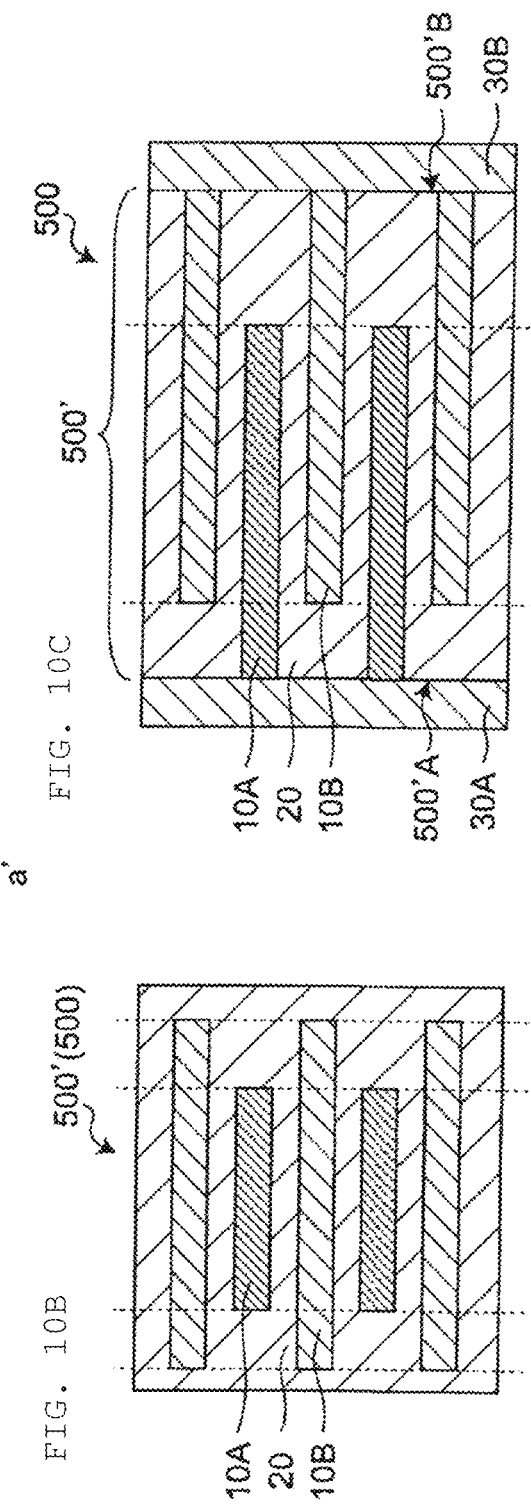

In an embodiment, both the positive electrode layer and the negative electrode layer may have a tapered shape toward their respective edges. In the exemplary embodiment shown in FIG. 2, both the positive electrode layer 10A and the negative electrode layer 10B have a tapered shape toward their respective edges. Since both the positive electrode layer and the negative electrode layer have a tapered shape, the contact area between the electrode region and the electrolyte region can be increased. Further, in a sectional view of the solid-state battery, the positive electrode layer and the negative electrode layer can have a substantially symmetrical shape. Moreover, in a sectional view of the solid-state battery, a structure in which the boundary regions between the electrode region and the electrolyte region in respective electrode layers are located on the same straight line (for example, the dotted line portions in FIGS. 10B and 10C) is particularly reduced. As a result, it is possible to more effectively prevent stress from concentrating on such boundary regions.

In an embodiment, the starting point forming the tapered shape in the positive electrode layer which is adjacent to the negative electrode layer and directly faces the negative electrode layer may be located inside or closer to the center side of the solid-state battery layered body with respect to the starting point forming the tapered shape toward the edge that terminates inside the solid-state battery layered body in the negative electrode layer. In the exemplary embodiment shown in FIG. 2, the starting point $O_A$ forming a tapered shape in the positive electrode layer 10A adjacent to the negative electrode layer 10B and directly facing the negative electrode layer 10B is located inside or closer to the center side of the solid-state battery layered body 500' with respect to the starting point $O_B$ forming a tapered shape toward the edge $10B_E$ terminating inside the solid-state battery layered body 500' in the negative electrode layer 10B. With such a configuration, when ions (for example, lithium ions) move from the positive electrode layer to the negative electrode layer during charging, it is possible to more effectively prevent ions from being reduced and precipitated. Thereby, the balance of the charge and discharge reaction in the stacking direction can be further improved.

In an embodiment, the electrode layer is composed of a plurality of, for example, two to five electrode sub-active material layers and sub-current collector layers, and the electrode sub-active material layer may have a tapered shape so as to have a tapered surface on at least one side of the sub-current collector layer in the electrode stacking direction. In the exemplary embodiment shown in FIG. 3, the positive electrode layer 10A is composed of two positive electrode sub-active material layers 11A and one sub-current collector layer 40, and each of the two positive electrode sub-active material layers 11A has a tapered shape so as to have tapered surfaces on both sides or upper and lower surfaces of the sub-current collector layer 40 in the electrode stacking direction. With such a configuration, the sub-current collector layer can be formed of a material having a relatively higher rigidity than that of the electrode sub-active material layer, so that the strength of the solid-state battery can be further increased. Further, since the electrode layer includes the sub-current collector layer, the solid-state battery layered body before sintering can have strength in the production of the solid-state battery, thereby making it possible to more effectively pack the solid-state battery.

The one or more electrode layers may be composed of a plurality of electrode sub-active material layers and sub-current collector layers. One of the positive electrode layer and the negative electrode layer may be composed of a plurality of electrode sub-active material layers and sub-current collector layers (see, FIG. 3). Both the positive electrode layer and the negative electrode layer may be composed of a plurality of electrode sub-active material layers and sub-current collector layers (see, FIGS. 4 and 6). The number of electrode layers including the sub-current collector layer may be optionally set from the viewpoint of the strength, electron conductivity, and battery capacity of the solid-state battery. In an embodiment, the negative electrode layer 10B may be composed of only the negative electrode sub-active material layer 11B containing a carbon material, and the positive electrode layer 10A may be composed of two positive electrode sub-active material layers 11A and one sub-current collector layer 40 (see, FIG. 3). With such a configuration, the charge-discharge efficiency can be improved by further increasing the electron conductivity while further increasing the strength of the solid-state battery in the positive electrode layer. This can increase the amount of the negative electrode active material in the negative electrode layer and thus increase the battery capacity.

The structure of the solid-state battery of the present specification may be observed from an image obtained by the following procedure. A section of the solid-state battery is cut out in a sectional view direction with an ion milling device (model number IM4000PLUS, manufactured by Hitachi High-Tech Corporation), and then an image of the section is acquired using a scanning electron microscope (SEM) (model number SU-8040, manufactured by Hitachi High-Tech Corporation). Further, the edge and the tapered shape in the electrode layer as used herein may be observed from the image acquired by the above-mentioned method. The distance between the edge and the starting point forming the tapered shape may refer to a value calculated from the dimension obtained from the similar image or may be determined by calculation.

The solid-state battery according to an embodiment of the present invention may be a layered solid-state battery in which each layer (material) constituting the battery is stacked, and can be produced by a printing method such as a screen printing method, a green sheet method using a green sheet, or a method combining these methods. Therefore, each layer constituting the battery may be formed of a sintered body. Preferably, the positive electrode layer, the negative electrode layer, and the solid electrolyte are each integrally sintered with each other. That is, it can be said that the solid-state battery layered body preferably forms a fired integrated product. In such a fired integrated product, at least one electrode layer of the positive electrode layer and the negative electrode layer has a tapered shape toward the edge of the electrode layer.

[Method of Producing Solid-State Battery]

As described above, the solid-state battery of the present disclosure can be produced by a printing method such as a screen printing method, a green sheet method using a green sheet, or a method combining these methods. Hereinafter, the case where the printing method and the green sheet method are adopted for understanding the present invention will be described in detail, but the present invention is not limited to this method.

(Step of Forming Solid-State Battery Layered Body Precursor)

In this step, several types of pastes such as a positive electrode layer paste, a negative electrode layer paste, a solid electrolyte layer paste, a current collector layer paste, an insulating part paste or an electrode separation part paste, and a protective layer paste are used as ink. That is, a paste having a predetermined structure is formed on a support substrate by applying the paste by a printing method.

At the time of printing, a solid-state battery layered body precursor corresponding to the structure of a predetermined solid-state battery can be formed on a substrate by sequentially stacking print layers having a predetermined thickness and pattern shape. The type of the pattern forming method is not particularly limited as long as it is a method capable of forming a predetermined pattern. For example, the pattern may be formed using any one or more types of the screen printing method, the gravure printing method, and the like.

The paste can be prepared by wet-mixing predetermined constituent materials in each layer appropriately selected from the group consisting of a positive electrode active material, a negative electrode active material, an electron conductive material, a solid electrolyte material, a current collector layer material, an insulating material, a protective material, a binder, a sintering aid, and the like with an organic vehicle obtained by dissolving an organic material in a solvent. The positive electrode active material layer paste contains, for example, a positive electrode active material, an electron conductive material, a solid electrolyte material, a binder, a sintering aid, an organic material, and a solvent.

The negative electrode active material layer paste contains, for example, a negative electrode active material, an electron conductive material, a solid electrolyte material, a binder, a sintering aid, an organic material, and a solvent. The solid electrolyte layer paste contains, for example, a solid electrolyte material, a binder, a sintering aid, an organic material, and a solvent. The current collector layer paste contains, for example, an electron conductive material, a binder, a sintering aid, an organic material, and a solvent. The protective layer paste contains, for example, an insulating material, a binder, an organic material, and a solvent. The insulating material paste contains, for example, an insulating material, a binder, an organic material, and a solvent.

The organic material contained in the paste is not particularly limited, but at least one polymer material selected from the group consisting of polyvinyl acetal resin, cellulose resin, polyacrylic resin, polyurethane resin, polyvinyl acetate resin, polyvinyl alcohol resin, and the like can be used. The type of the solvent is not particularly limited, and for example, any one or more types of organic solvents such as butyl acetate, N-methyl-pyrrolidone, toluene, terpineol, and N-methyl-pyrrolidone can be used.

In the wet mixing, a medium can be used, and specifically, a ball mill method, a Visco mill method, or the like can be used. On the other hand, a wet mixing method that does not use a medium may be used, and a sand mill method, a high-pressure homogenizer method, a kneader dispersion method, or the like can be used.

The substrate is not particularly limited as long as it is a support capable of supporting each paste layer, and is, for example, a release-treated film whose one surface has been subjected to release treatment. Specifically, a substrate made of a polymer material such as polyethylene terephthalate can be used. When respective paste layers are subjected to the firing step in a state in which the paste layers are held on the substrate, a substrate that exhibits heat resistance to the firing temperature may be used. In the present disclosure, the substrate may be referred to as a support substrate.

The applied pastes are dried on a hot plate heated to 30° C. or higher and 50° C. or lower, whereby a positive electrode layer green sheet, a negative electrode layer green sheet, a solid electrolyte layer green sheet, an insulating material green sheet, and/or a protective layer green sheet, or the like having a predetermined shape and thickness are each formed on a substrate (for example, a PET film).

Next, each green sheet is peeled off from the substrate. After peeling, a solid-state battery layered body precursor is formed by sequentially stacking the green sheets of each components of the battery constituent unit along the stacking direction. After stacking, a solid electrolyte, an insulating material and/or a protective layer may be provided on the side region of the electrode green sheet by screen printing.

(Firing Step)

In the firing step, the solid-state battery layered body precursor is subjected to firing. Although it is only an example, firing can be performed by removing organic materials, for example, at 200° C. or higher and 500° C. or lower in a nitrogen gas atmosphere containing oxygen gas or in an air atmosphere, and then heating the solid-state battery layered body precursor, for example, at 300° C. or higher and 5,000° C. or lower in a nitrogen gas atmosphere or in an air atmosphere. Firing may be performed while pressurizing the solid-state battery layered body precursor in the stacking direction (in some cases, the stacking direction and the direction perpendicular to the stacking direction).

Through such firing, a solid-state battery layered body is formed, and finally, a desired solid-state battery is obtained.

(Regarding Production of the Characteristic Portion in Present Invention)

The tapered shape toward the edge of the solid-state battery of the present invention may be formed by any method as long as at least the thickness dimension of the edge is smaller than the thickness dimension of the electrode layer portion other than the edge in a sectional view of the same electrode layer. For example, the layer formation may be prepared so that the thickness dimension of the edge of the electrode layer is smaller than the thickness dimension of the central portion of the electrode layer.

As an example, in the screen printing method, a tapered shape may be formed toward the edge of the electrode layer by using a screen plate whose mesh diameter decreases toward the edge of the electrode layer with respect to the mesh diameter of the screen plate applied to the central portion of the electrode layer. Further, in the printing method, the viscosity of the electrode layer paste may be adjusted so that the film thickness decreases toward the edge of the electrode layer (for example, the viscosity of the paste is adjusted to a low viscosity so that the application edge sags). The viscosity of the electrode layer paste is preferably 1,000 mPa·s to 30,000 mPa·s, for example, 5,000 mPa·s to 15,000 mPa·s.

Further, various tapered shapes can be formed depending on the order of applying the pastes of the electrode layer and the solid electrolyte (or the insulating material) in the printing method. As an example, a tapered shape may be formed by applying a low-viscosity electrode layer paste so that the film thickness of the application edge is thinner than the film thickness of the base layer. Alternatively, a tapered shape may be formed by applying a low-viscosity solid electrolyte layer paste to form a base layer of a solid electrolyte having a recessed portion having a tapered contour, and then applying the electrode layer paste to the recessed portion.

For example, the solid-state battery layered body illustrated in FIG. 2 can be formed by sequentially applying each layer from the lower direction of the drawing. Here, use of a low-viscosity paste for the electrode layer allows formation of a tapered shape in which the application edge protrudes in the lower direction of the drawing. An electrode layer having a tapered shape protruding in the lower direction of the drawing can be formed by applying a low-viscosity electrode layer paste prior to the application of the solid electrolyte 20 on the surface on which the electrode layer of FIG. 2 (that is, the positive electrode layer 10A and the negative electrode layer 10B) is formed.

Hereinafter, a method for producing a solid-state battery (particularly, an electrode layer having a tapered shape) will be specifically described based on the exemplary embodiments shown in FIGS. 8 and 9. However, the method for producing a solid-state battery of the present disclosure is not limited to the following production method.

In order to produce a solid-state battery, for example, a step of forming a positive electrode green sheet, a step of forming a negative electrode green sheet, a step of forming a solid-state battery layered body, and, as necessary, a step of forming a positive electrode terminal and a negative electrode terminal are performed as described below. In this exemplary embodiment, description will be given based on the section (see, FIG. 3) along the positive electrode side end surface of a solid-state battery including a positive electrode layer composed of a positive electrode sub-active material layer and a sub-current collector layer, and a negative electrode layer composed of only a negative electrode (sub)-active material layer.

[Step of Forming Positive Electrode Green Sheet]

First, a solid electrolyte layer paste is prepared by mixing a solid electrolyte, a solvent, and as necessary, a binder or the like with each other. Subsequently, a solid electrolyte layer 20 is formed by applying the solid electrolyte layer paste to one surface of a substrate 50 (see, FIG. 8A). Further, the solid electrolyte layer 20 having a recessed portion having a tapered contour is formed by applying the solid electrolyte layer paste to both ends of the surface of the solid electrolyte layer 20 so that the application edge or the center side becomes thin (see, FIG. 8B).

Next, a positive electrode active material layer paste is prepared by mixing a positive electrode active material, a solvent, and as necessary, a binder or the like with each other. Subsequently, the positive electrode sub-active material layer 11A is formed by applying the positive electrode active material layer paste to the recessed portion of the solid electrolyte layer 20 by the pattern forming method (see, FIG. 8C).

Next, a current collector layer paste is prepared by mixing an electron conductive material, a solvent, and as necessary, a binder or the like with each other. Subsequently, the sub-current collector layer 40 is formed by applying the current collector layer paste onto the positive electrode sub-active material layer 11A by the pattern forming method (see, FIG. 8D).

Figure 8A:
FIGS. 8A to 8F are schematic sectional views showing a method of producing an electrode layer composed of an electrode sub-active material layer and a sub-current collector layer in the solid-state battery according to an embodiment of the present invention.
Figure 8B:
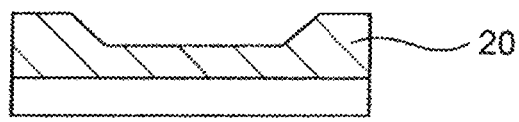
Figure 8C:
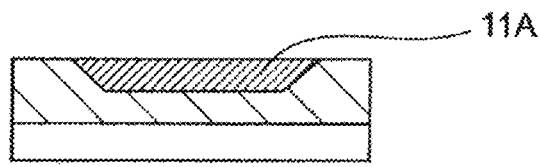
Figure 8D:
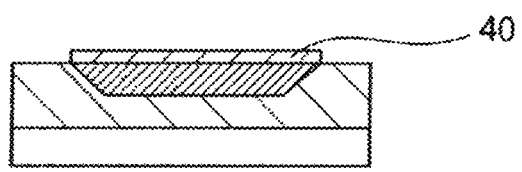
Figure 8E:
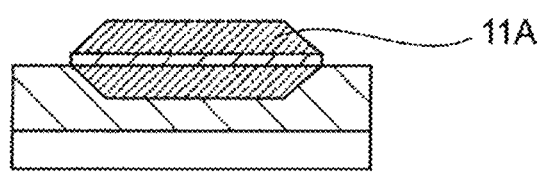

Next, the positive electrode sub-active material layer 11A is formed by applying the positive electrode active material layer paste onto the sub-current collector layer 40 by the pattern forming method so that the application edge or the edge side becomes thin (see, FIG. 8E).

Figure 8F:
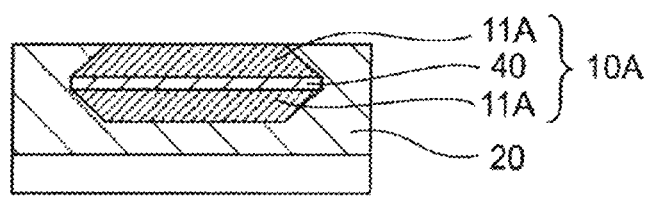

Finally, the solid electrolyte layer 20 is formed by applying the solid electrolyte layer paste or the insulating material paste so as to fill the sides of the positive electrode sub-active material layer 11A and the sub-current collector layer 40 (see, FIG. 8F). As a result, a positive electrode green sheet on which the positive electrode layer 10A composed of the positive electrode sub-active material layer 11A and the sub-current collector layer 40 and the solid electrolyte layer 20 are formed can be obtained. Here, the positive electrode layer 10A has a tapered shape so that the two positive electrode sub-active material layers 11A each have tapered surfaces on both sides or upper and lower surfaces of the sub-current collector layer 40.

[Step of Forming Negative Electrode Green Sheet]

Figure 9A:
FIGS. 9A to 9C are schematic sectional views showing a method for producing an electrode layer composed of only an electrode sub-active material layer in the solid-state battery according to an embodiment of the present invention.
Figure 9B:
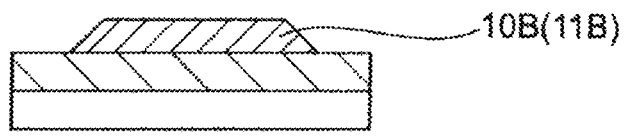

First, the solid electrolyte layer 20 is formed on one surface of another substrate 50 by the above procedure (see, FIG. 9A).

Subsequently, a negative electrode active material layer paste is prepared by mixing a negative electrode active material, a solvent, and as necessary, a negative electrode active material binder or the like with each other. Subsequently, the negative electrode layer 10B is formed by applying the negative electrode active material layer paste onto the solid electrolyte layer 20 by the pattern forming method so that the application edge or the edge side becomes thin (see, FIG. 9B).

Figure 9C:
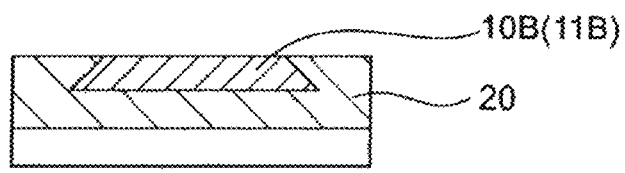

Finally, the solid electrolyte layer 20 is formed by applying the solid electrolyte layer paste or the insulating material paste so as to fill the sides of the negative electrode layer 10B (see, FIG. 9C). As a result, a negative electrode green sheet on which the negative electrode layer 10B and the solid electrolyte layer 20 are formed can be obtained. Here, the negative electrode layer 10B has a tapered shape so as to have a tapered surface on one side or the upper side.

[Step of Forming Solid-State Battery Layered Body]

First, the negative electrode green sheet peeled off from the substrate 50 and the positive electrode green sheet peeled off from the substrate 50 are alternately stacked in this order. Here, for example, three negative electrode green sheets and two positive electrode green sheets are alternately stacked.

Next, the solid electrolyte layer 20 is formed on the stacked negative electrode green sheet by the same procedure as the procedure for forming the solid electrolyte layer 20. As a result, a solid-state battery layered body precursor is formed.

Finally, the solid-state battery layered body precursor is heated. During heating, the heating temperature is set so that a series of layers constituting the solid-state battery layered body precursor can be sintered. Other conditions such as heating time can be optionally set.

A series of layers constituting the solid-state battery layered body precursor can be sintered by this heat treatment, so that the series of layers can be thermocompression-bonded. Thereby, a solid-state battery layered body can be formed.

[Step of Forming Positive Electrode Terminal and Negative Electrode Terminal]

For example, the positive electrode terminal is bonded to the solid-state battery layered body by using a conductive binder, and for example, the negative electrode terminal is bonded to the solid-state battery layered body by using a conductive binder. As a result, each of the positive electrode terminal and the negative electrode terminal can be attached to the solid-state battery layered body, so that the solid-state battery is completed.

Although the embodiments of the present invention have been described above, they merely exemplify typical examples. Therefore, those skilled in the art will easily understand that the present invention is not limited to this, and various embodiments or changes can be considered without changing the gist of the present invention.

Figure 3:
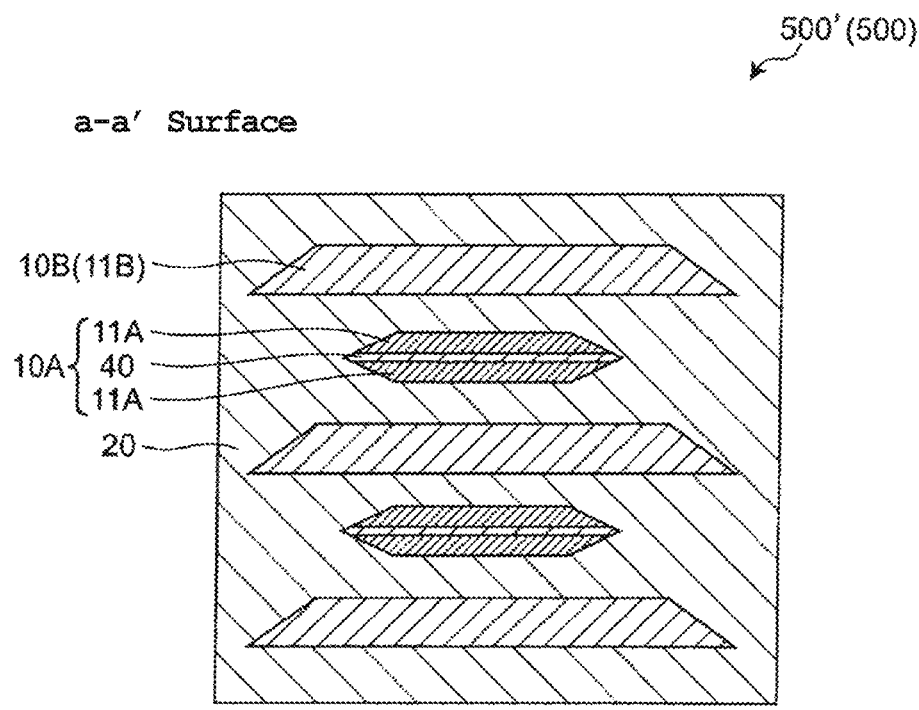
FIG. 3 is a schematic view showing another embodiment of the section of the solid-state battery along the a-a' line in FIG. 1.

For example, in the above description, the solid-state battery exemplified in FIG. 3 has been mainly described, for example, but the present invention is not necessarily limited thereto. The present invention can be similarly applied to any solid-state battery as long as it has at least a positive electrode layer, a negative electrode layer, and a solid electrolyte layer, and in a sectional view of the solid-state battery, at least one electrode layer of the positive electrode layer and the negative electrode layer has a tapered shape toward the edge of the electrode layer.

The solid-state battery of the present invention can be used in various fields where power storage is expected. Although it is only an example, the solid-state battery of the present invention can be used in the fields where electrical or electronic equipment is used, such as electronic, information, and communication fields (for example, electrical or electronic equipment fields or mobile equipment fields including small electronic devices such as mobile phones, smart phones, laptop computers, digital cameras, activity meters, arm computers, electronic paper, wearable devices, RFID tags, card-type electronic money, and smart watches), home and small industrial applications (for example, fields of electric tools, golf carts, and home/nursing/industrial robots), large industrial applications (for example, fields of forklifts, elevators, and bay port cranes), transportation system fields (for example, fields of hybrid cars, electric cars, buses, trains, electric assisted bicycles, and electric motorcycles), power system applications (for example, fields of various power generations, road conditioners, smart grids, and general home-installed power storage systems), medical applications (medical equipment fields such as earphone hearing aids), pharmaceutical applications (for example, fields of dose management systems), IoT fields, and space and deep sea applications (for example, fields of space explorers, and submersible research vessels).

DESCRIPTION OF REFERENCE SYMBOLS

10: Electrode layer
10A: Positive electrode layer
10B: Negative electrode layer
11: Electrode sub-active material layer
11A: Positive electrode sub-active material layer
11B: Negative electrode sub-active material layer
20: Solid electrolyte or solid electrolyte layer
30: Terminal
30A: Positive electrode terminal
30B: Negative electrode terminal
40: Sub-current collector layer
50: Substrate or support substrate
500': Solid-state battery layered body
500'A: Positive electrode side end surface
500'B: Negative electrode side end surface
500: Solid-state battery

The invention claimed is:

1. A solid-state battery comprising:
a solid-state battery layered body including a positive electrode layer, a negative electrode layer, and a solid electrolyte interposed between the positive electrode layer and the negative electrode layer,
wherein in a sectional view of the solid-state battery, at least one electrode layer of the positive electrode layer and the negative electrode layer has a tapered shape toward at least one edge of the electrode layer;
wherein the positive electrode layer, the negative electrode layer, and the solid electrolyte are an integrally sintered body; and
wherein the at least one edge having the tapered shape is surrounded by the solid electrolyte.

2. The solid-state battery according to claim 1, wherein the tapered shape is a shape gradually or stepwise becomes smaller toward the at least one edge of the electrode layer.

3. The solid-state battery according to claim 2, wherein the tapered shape is linear.

4. The solid-state battery according to claim 2, wherein the tapered shape is curved.

5. The solid-state battery according to claim 1, wherein the tapered shape starts from a distance in a range of 10 μm to 200 μm from the at least one edge of the electrode layer.

6. The solid-state battery according to claim 5, wherein a starting point of the tapered shape is a position where a thickness of an electrode active material layer in the electrode layer is reduced by 5% with respect to a thickness of a central portion of the electrode active material layer.

7. The solid-state battery according to claim 1, wherein in a sectional view of the solid-state battery, the electrode layer has the tapered shape on opposed edges thereof in an electrode stacking direction.

8. The solid-state battery according to claim 1, wherein the electrode layer has the tapered shape along all edges of the electrode layer.

9. The solid-state battery according to claim 8, wherein all the edges of the electrode layer terminate inside the solid-state battery layered body.

10. The solid-state battery according to claim 9, wherein a start point of the tapered shape in the positive electrode layer is located closer to a center of the solid-state battery layered body with respect to a start point of tapered shape in the negative electrode layer, and each of the respective at least one edge of the positive electrode layer and the negative electrode layer terminate inside the solid state battery layered body.

11. The solid-state battery according to claim 10, wherein the start point of the tapered shape in the positive electrode layer starts from a distance in a range of 10 μm to 200 μm from the at least one edge of the positive electrode layer; and the start point of the tapered shape in the negative electrode layer starts from a distance in a range of 10 μm to 200 μm from the at least one edge of the negative electrode layer.

12. The solid-state battery according to claim 11, wherein the start point of the tapered shape in the positive electrode layer is a position where a thickness of a positive electrode active material layer in the positive electrode layer is reduced by 5% with respect to a thickness of a central portion of the positive electrode active material layer, and the start point of the tapered shape in the negative electrode layer is a position where a thickness of a negative electrode active material layer in the negative electrode layer is reduced by 5% with respect to a thickness of a central portion of the negative electrode active material layer.

13. The solid-state battery according to claim 1, wherein both of the positive electrode layer and the negative electrode layer have the tapered shape toward the at least one edge thereof.

14. The solid-state battery according to claim 1, wherein the electrode layer is composed of a plurality of electrode sub-active material layers and a sub-current collector layer, and each of the plurality of electrode sub-active material layers has the tapered shape on at least one side of the sub-current collector layer in an electrode stacking direction.

15. The solid-state battery according to claim 1, wherein the solid electrolyte layer contains at least one selected from the group consisting of an oxide crystal material, an oxide glass material, and an oxide glass ceramic material.

16. The solid-state battery according to claim 1, wherein the positive electrode layer and the negative electrode layer are layers capable of occluding and releasing lithium ions.

17. The solid-state battery according to claim 1, wherein a number of the electrode layers having the tapered shape is half or more of all electrode layers of the solid state battery.

18. The solid-state battery according to claim 17, wherein the number of the electrode layers having the tapered shape is ¾ or more of all the electrode layers of the solid state battery.

* * * * *